Figure 1:
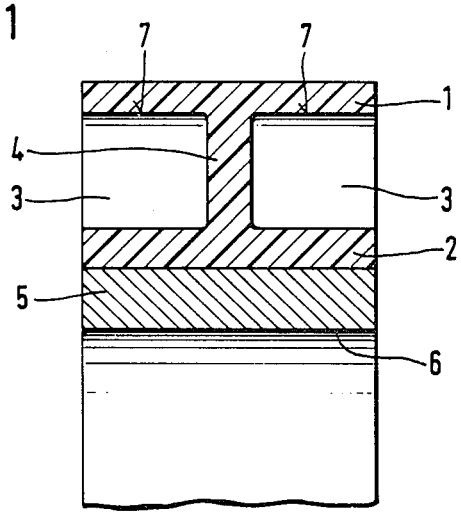

United States Patent [19]

Kraus

[11] Patent Number: 4,762,739

[45] Date of Patent: Aug. 9, 1988

[54] CONCENTRIC TUBULAR ELEMENTS

[75] Inventor: Gerhard Kraus, Aurachtal, Fed. Rep. of Germany

[73] Assignee: INA Walzlager Schaeffler KG, Fed. Rep. of Germany

[21] Appl. No.: 33,025

[22] Filed: Mar. 31, 1987

[30] Foreign Application Priority Data

Apr. 26, 1986 [DE] Fed. Rep. of Germany ....... 3614260

[51] Int. Cl.$^4$ .............................................. B60B 5/02
[52] U.S. Cl. .................................. 428/36; 301/63 PW
[58] Field of Search ...................... 428/36; 301/55, 59, 301/63 PW, 63 R; 242/155 R

[56] References Cited

U.S. PATENT DOCUMENTS 4,164,251  8/1979  Chung ........................... 301/63 PW

FOREIGN PATENT DOCUMENTS 642417   4/1964  Belgium ......................... 301/63 PW
1033377  4/1963  United Kingdom .......... 301/63 PW

OTHER PUBLICATIONS

Motor Wheel, "Complete Parts List for 1971".

Primary Examiner—Henry F. Epstein
Assistant Examiner—Betsy A. Bozzelli
Attorney, Agent, or Firm—Bierman and Muserlian

[57] ABSTRACT

A structural element made of injection moldable or castable polymeric material comprising an external tubular element, an inner tubular element essentially concentric with the latter and integrally connected with the latter by ribs arranged in planes extending essentially in the direction of the longitudinal axis of the structural element, characterized in that the ribs (3) have a radius ($R_1$) verging into the bore wall (7) of the external tubular element (1) which is considerably less than the radius of curvature ($R_2$) of the bore wall (7) section connecting the radii ($R_1$) of two adjacent ribs (3), the radius of curvature ($R_2$) being smaller than the radius ($R_3$) of the circle circumscribing the bore wall (7).

4 Claims, 1 Drawing Sheet

CONCENTRIC TUBULAR ELEMENTS

STATE OF THE ART

Structural elements made of injection moldable or castable polymeric material comprising an external tubular element and an internal tubular element essentially concentric to the latter and integrally connected with the latter by ribs arranged in planes essentially extending in direction of the longitudinal axis of the structural part are known from French Pat. No. 1,277,806 and are used as impellers, pulleys or belt tension rollers. In view of the molding behavior of the polymeric material, the outer surface of the external tubular element which defines the running surface of the impeller or the running surface for the belt in case of pulleys or tension rollers is of an enlarged diameter in the junction area of the ribs so that the recently increasing demands on the accuracy of running of the mentioned structural parts cannot be met.

DE-OS No. 3,401,898 discloses a structural element which attempts to overcome this drawback so that the ribs, the external and internal tubular elements confine recesses of circular or polygonal shape. However, this measure proved only partially successful. Moreover, preexisting injection molds or casting molds cannot be modified or only at considerable expense to allow production of structural elements according to the teaching of DE-OS No. 3,401,898.

OBJECTS OF THE INVENTION

It is an object of the invention to provide a structural element of the above-mentioned type with a guaranteed high degree of accuracy of running and producibility in preexisting molds without being subjected to expensive modifications.

This and other objects and advantages of the invention will become obvious from the following detailed description.

THE INVENTION

The structural element of the invention is made of injection moldable or castable polymeric material comprising an external tubular element, an inner tubular element essentially concentric with the latter and integrally connected with the latter by ribs arranged in planes extending essentially in the direction of the longitudinal axis of the structural element, is characterized in that the ribs (3) have a radius ($R_1$) verging into the bore wall (7) of the external tubular element (1) which is considerably less than the radius of curvature ($R_2$) of the bore wall (7) section connecting the radii ($R_1$) of two adjacent ribs (3), the radius of curvature ($R_2$) being smaller than the radius ($R_3$) of the circle circumscribing the bore wall (7).

The invention thus utilizes the fact that polymeric materials increasingly shrink during molding with increasing wall thickness which means that diameter enlargements obtained at the outer surface of the external tubular element in the junction area of the ribs with its bore wall are compensated by providing the structural element in this area with an increased wall thickness in accordance with the invention and thus allowing it to shrink to a greater degree. The production of structural elements of the invention in preexisting molds can be effected in an extremely cost efficient manner since only a refinishing in the junction area of the ribs with the bore wall of the external tubular element is required.

In a modification of the invention, an especially high accuracy of running is obtained when the structural element of the invention is designed so that the radius by which the ribs verge into bore wall of the external tubular element is at most 50% of the radius of curvature defined by the section of the bore wall connecting the radii. According to a feature of the invention, a further improvement of the accuracy of running is obtained when the wall thickness of the ribs increases from the internal tubular section toward the radii.

REFERRING NOW TO THE DRAWINGS

Figure 2:
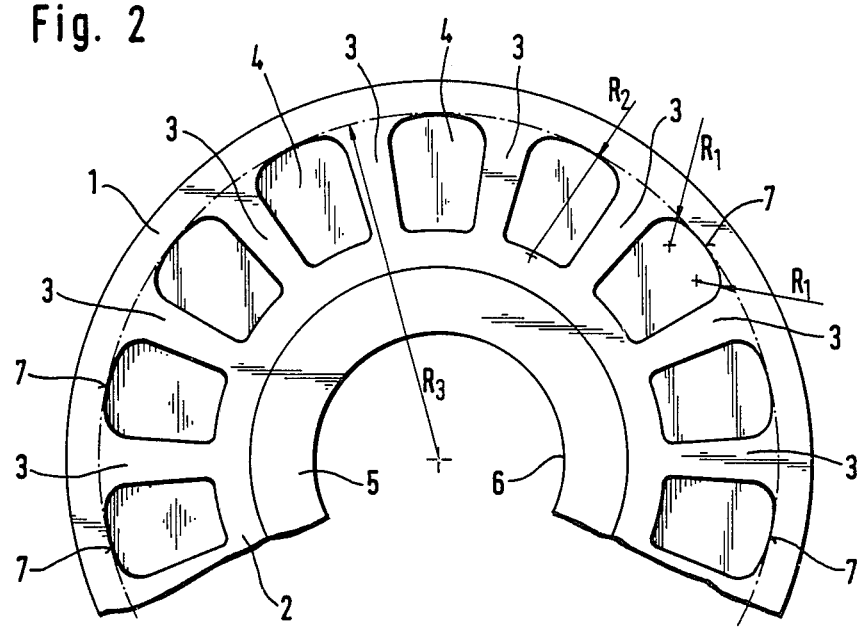

FIG. 1 is a partial longitudinal cross-section of a belt tension roller of the invention and FIG. 2 is a partial front view of the belt tension roller of FIG. 1.

FIGS. 1 and 2 illustrate a belt tension roller of the invention comprising an external tubular element 1 and an internal tubular element 2 essentially concentric thereto. Both elements 1 and 2 are integrally connected with each other by ribs 3 which are arranged in planes essentially extending in the direction of the longitudinal axis of the tension roller. The outer surface of the external tubular element 1 acts as the running surface for the belt. Moreover, the tension roller is provided in a plane extending perpendicular to its longitudinal axis with a reinforcing wall 4 which connects both tubular elements 1 and 2 with each other and is traversed by the ribs 3. Accommodated within the bore of the internal tubular element 2 is a metallic sleeve 5 whose bore 6 is adapted to receive a roller bearing. Under certain circumstances, the wall of the bore 6 may also be adapted to serve directly as a running surface for rolling elements of the roller bearing which supports the tension roller, or as an outer running surface of a sliding bearing. However, it is also possible to attach the tension roller via the sleeve 6 on a rotatably supported shaft.

As can be seen from FIG. 2, the ribs 3 are defined by a radius $R_1$ which verges into the bore wall 7 of the external tubular element 1 and is considerably smaller than the radius of curvature $R_2$ defined by the section of the bore wall 7 connecting the radii $R_1$ of two adjoining ribs 3. The radius of curvature $R_2$ is smaller than the radius $R_3$ of the circle which circumscribes the bore wall 7 and is indicated by the dash-dot line in FIG. 2. As is further illustrated in FIG. 2, the radius $R_1$ by which the ribs 3 verge into the bore wall 7 of the external tubular element 1 is less than 50% of the radius of curvature $R_2$ of the section of the bore wall 7 connecting the radii $R_1$ wherein the wall thickness of the ribs 3 continuously increases from the internal tubular element 2 toward the radii $R_1$.

The illustrated embodiment is described only by way of example. For instance, the sleeve 6 is not necessarily required and the outer surface of the external tubular element 1 may differ from the exemplified embodiment depending on its respective use. For example, when using the structural element of the invention as a pulley, the outer surface may be contoured corresponding to the respective belt.

Various other modifications of the structural element of the invention may be made without departing from the spirit or scope thereof and, it should be understood that the invention is intended to be limited only as defined in the appended claims.

What I claim is:

1. A structural element made of injection moldable or castable polymeric material comprising an external tubular element, an inner tubular element essentially concentric with the latter and integrally connected with the latter by ribs arranged in planes containing essentially the longitudinal axis of the structural element, characterized in that the ribs (3) have a radius ($R_1$) verging into the bore wall (7) of the external tubular element (1) which is considerably less than the radius of curvature ($R_2$) of the bore wall (7) section connecting the radii ($R_1$) of two adjacent ribs (3), the radius of curvature ($R_2$) being smaller than the radius ($R_3$) of the circle circumscribing the bore wall (7).

2. A structural element of claim 1 wherein the wall thickness of the ribs (3) increases from the internal tubular element (2) toward the radii ($R_1$).

3. A structural element of claim 1 wherein the radius ($R_1$) with which the ribs (3) verge into the bore wall (7) of the external tubular element (1) is at most 50% of the radius of curvature ($R_2$) of the bore wall (7) section connecting the radii ($R_1$).

4. A structural element of claim 3 wherein the wall thickness of the ribs (3) increases from the internal tubular element (2) toward the radii ($R_1$).

* * * * *